United States Patent [19]

Needleman

[11] Patent Number: 4,633,703
[45] Date of Patent: Jan. 6, 1987

[54] SHOCK ABSORBER TESTING APPARATUS

[76] Inventor: Nathan Needleman, Augusta-Anlage 14, 6800 Mannheim, Fed. Rep. of Germany

[21] Appl. No.: 674,824

[22] Filed: Nov. 26, 1984

[30] Foreign Application Priority Data

Oct. 11, 1984 [DE] Fed. Rep. of Germany ... 8429976[U]

[51] Int. Cl.⁴ .......................................... G01M 17/04
[52] U.S. Cl. .......................................... 73/11; 73/654
[58] Field of Search .............. 73/11, 654, 493, 669, 73/517 R; 377/23

[56] References Cited

U.S. PATENT DOCUMENTS

| 2,286,897 | 6/1942 | Costa et al. | 73/654 X |
|---|---|---|---|
| 2,316,616 | 4/1943 | Powell | 73/654 X |
| 2,487,029 | 11/1949 | Piety | 73/654 X |
| 3,383,909 | 5/1968 | Percy | 73/11 X |
| 3,474,680 | 10/1969 | Babson et al. | 73/654 X |
| 3,477,273 | 11/1969 | Scheider | 73/11 |
| 4,062,221 | 12/1977 | Oberheide et al. | 73/11 |

*Primary Examiner*—Charles A. Ruehl
*Attorney, Agent, or Firm*—Staas & Halsey

[57] ABSTRACT

A shock absorber test unit is provided, including a housing attached to an automobile body by magnets. The housing has a mass, such as a permanent magnet or coil, which swings with damped oscillations due to inertia. The number of oscillations is counted and indicated on a digital display on the housing via an inductive oscillation sensor attached to the interior of the housing after a jolt of the automobile.

10 Claims, 4 Drawing Figures

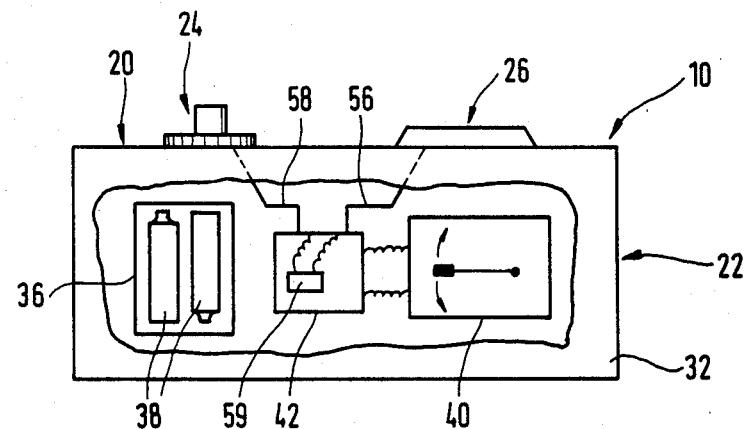
FIG. 2
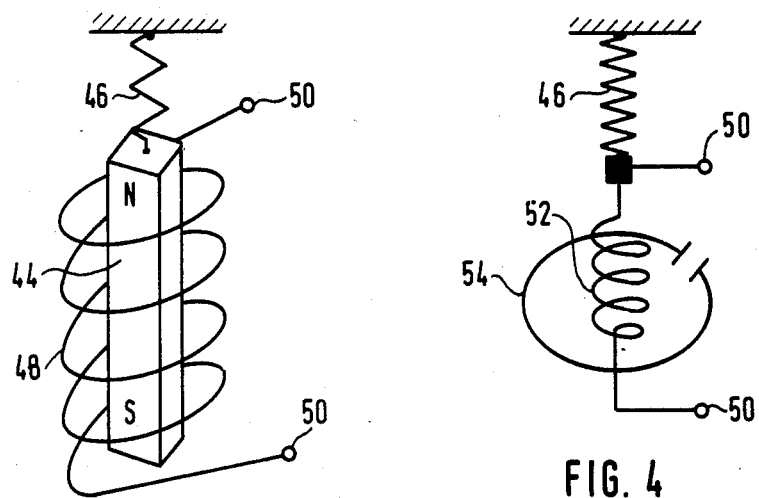
FIG. 3
FIG. 4

SHOCK ABSORBER TESTING APPARATUS

The invention relates to a unit for testing shock absorbers in vehicles.

Such a shock absorber test unit is known for German Offenlegungsschrift, DE-OS No. 27.32.146. It comprises a housing that may be attached to the body of a car by means of suction cups. Said housing contains a mass which may swing with damped oscillations due to inertia. Said mass has the form of a shutter with a spring-loaded suspension on a balance arm. Said shutter lies in the path of rays between a light source and a light detector, said path being interrupted when said shutter is in the state of rest. However, if the shutter is deflected and made to oscillate, the light can impinge on the detector through slots provided in said shutter. The number of light pulses generated in this way is detected in an evaluating module and indicated. Said evaluating module is a separate unit connected by a cable to the actual shock absorber test unit.

In order to test the shock absorbers of a car, the test unit is attached to the car body in the wheel area. The car is then subjected to a well-defined test jolt, e.g. by making the car go over a threshold or fall from a certain height. The test unit is exposed to the same jolt which is more or less well absorbed by the shock absorbers of the car. The resultant reaction forces subject the shutter contained in the test housing to damped oscillations, causing a number of light pulses to be received at the detector until the shutter comes to rest again. The number of light pulses is indicative of the quality of the shock absorber.

In operation, this known shock absorber test unit is quite satisfactory in principle, but its design is complicated. The swinging suspension of the shutter and its adjustment require a great deal of mechanical precision work. Nor is the unit as sturdy as is necessary for the hard operating conditions in a car repair shop.

It is the object of the present invention to further develop and improve upon the described shock absorber test unit so that it is less complicated in design, considerably easier and cheaper to produce and is more stable.

This object is reached by making the mass capable of oscillation in the shock absorber test unit a part of an inductive oscillation sensor fixed inside the housing of the test unit.

The number of oscillations performed by the mass following an exciting jolt is counted by said inductive oscillation sensor by induction. The apparati required therefor are far less than in the case of optical detection. The oscillation sensor may be installed as a complete structural unit in the housing of the shock absorber test unit and clamped or fixed to, e.g., the inside wall thereof. Complicated mounting and adjusting work is no longer necessary. Moreover, the resulting unit is very sturdy and compact.

According to one embodiment of the invention, the mass capable of oscillation may be a permanent magnet. The movements of such a permanent magnet can be detected in a simple way by means of an excitation coil, an induction loop or the like. Instead of a permanent magnet, a current-carrying coil may also be used as a mass capable of oscillation.

According to another embodiment of the invention, the inductive oscillation sensor is designed as a pulse generator. Such a pulse generator may be connected particularly easily to an evaluating module, a counter or the like.

An oscillation sensor which is moderate in price and not very complicated in design is obtained by converting an ammeter.

Furthermore, the invention departs from the known arrangement of suction cups for attaching the shock absorber test unit to the car body. Instead, magnetic holders fixed on the outside of the housing should be used. These magnetic holders have the advantage over suction cups of adhering without having to be pressed to the car body. There is therefore no risk of denting the car body. It is also easier to attach magnetic holders to curved or arched parts of the body, and dirt on the car body does not impair adhesion, as may well occur with suction cups. Finally, magnetic holders are also subject to less wear and tear than suction cups made of soft rubber or plastics.

According to another embodiment of the invention, the housing is rectangular in shape and, in order to achieve two-point contact, two magnetic holders are provided with maximum spacing on one longitudinal side of said housing. With this design, particularly stable two-point contact is achieved between the shock absorber test unit and the car body. It is also highly suited for securely attaching the unit to curved parts of the car body.

Furthermore, the magnetic holders may be square in shape and their edge lengths may be adjusted in such a way that they correspond approximately to the width of the housing on the longitudinal side for attachment to the car body. In this way, a smooth and ergonomically favorable housing edge is obtained, and the area available for the magnets is optimal, resulting in strong adhesion.

According to another embodiment of the invention, all the evaluating and indicating members required are integral of the housing which is attached to the car body. It is no longer necessary to have a separate evaluating unit and a cable connection between the evaluating and the test unit, as was necessary in the prior art. Thus, with the invention a compact, non-stationary hand-operated unit is provided. In particular, the housing itself contains a counter connected to the inductive oscillation sensor for counting the oscillations of the mass. This counter may also be part of an evaluating module. Furthermore, it is suggested that a display be provided on the outside of the housing, said display being connected to the counter and displaying the counted value thereof.

The batteries in the housing which supply energy independent of the electric mains system ultimately serve the very purpose of the inventive concept of a non-stationary shock absorber test unit in the form of a hand-operated unit.

The invention is illustrated in greater detail below by means of an exemplified embodiment shown in the drawings.

FIG. 2 is a side, cross-sectional view into the housing of the shock absorber test unit;

FIGS. 3 and 4 are schematic views illustrating the principle of an inductive oscillation sensor.

Figure 1:
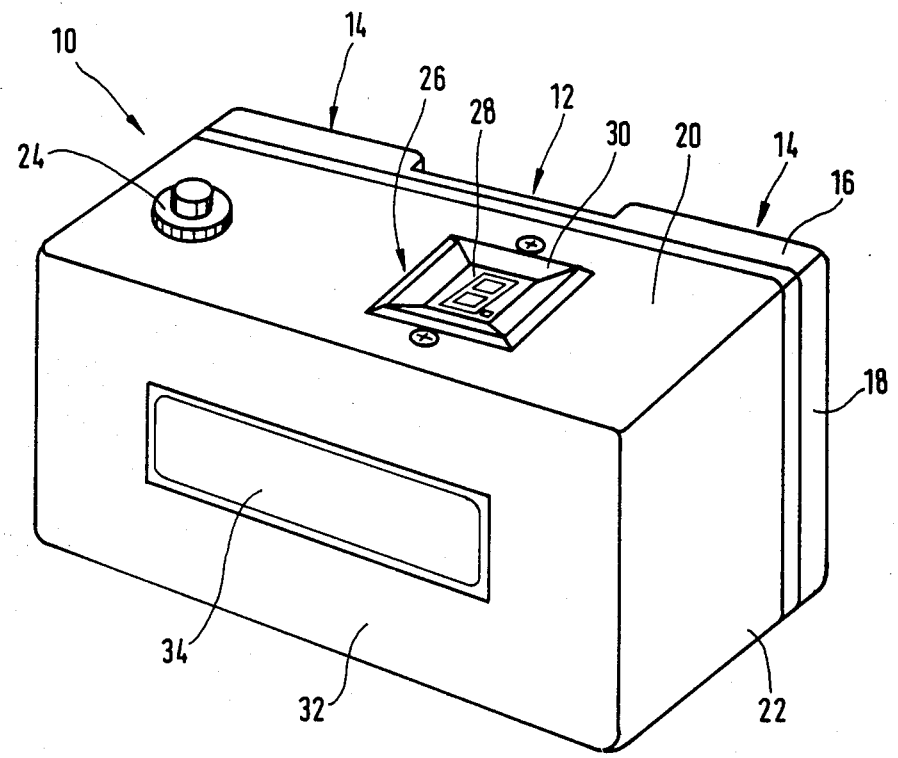
FIG. 1 is a perspective view of the shock absorber test unit of the present invention.

FIG. 1 is approximately a full-scale view of a shock absorber test unit designed according to the invention as a compact hand-operated unit and containing in a housing 10 all the members essential for its operation. Housing 10 is rectangular in shape with rounded-off corners and edges. There are two magnetic holders 14 on base 12 of housing 10. They serve to attach the unit to the body of the car whose shock absorbers are to be tested. The magnetic holders 14 are plates which are approximately square in shape. They extend over the full width of base 12 and are arranged in the lateral marginal area of base 12 so that their lateral limiting surfaces 16,18 are flush with the lateral surfaces 20,22 of housing 10. Corners and edges of the magnetic holders 14 are rounded off in the same way as those of housing 10 to provide an agreeable uniform outer contour of said housing. The magnetic holders 14 protrude from base 12 of housing 10. They are laterally spaced in such a way that the gap between them corresponds in width approximately to that of one magnetic holder. Thus, the unit as a whole has the form of a U-shaped bracket whose back is formed by housing 10 and whose short legs are formed by the magnetic holders 14. This bracket shape makes it possible to bridge bends and curves in the car body when attaching the test unit. Owing to the presence of two magnetic holders 14, a stable two-point contact is ensured.

The magnetic holders 14 consist of permanent magnet plates encapsulated in plastic. When the test unit is attached, only a plastic layer comes into contact with the painted parts of the car body. Damage to the paint is ruled out, especially when using soft plastics. In addition, the plastic coating protects the permanent magnets and makes the surface easy to clean.

The test unit is attached to the car body in such a way that one of its broadsides 20 is on top. On this broadside there is a push button 24 and a digital display 26. Display 26 may be a commercial LED or liquid crystal display. It has a single-digit display field 28 showing the digit 0 in FIG. 1.The display field 28 has a frame 30 which protrudes slightly from the broadside 20 of housing 10.

The view in FIG. 1 shows upper side 32 opposite of base 12 of housing 10. Type plate 34 is in the center of upper side 32.

In FIG. 2 upper side 32 of housing 10 is cut open and the various structural members contained therein are shown diagrammatically. A battery cell 36 with one or several batteries 38 contained therein supplies the unit with energy. The battery connections have been omitted for the sake of clarity. Further members contained in said housing are an inductive oscillation sensor 40 and an evaluating module 42 containing a counter.

The inductive oscillation sensor contains a mass 50 which may swing with damped oscillations due to inertia when the car with the shock absorber test unit attached thereto is subjected to a test jolt. The movements of the mass induce voltage pulses which are processed and especially counted in evaluating module 42. The number of the voltage pulses is an indication of the quality of the shock absorber which absorbs the test jolt.

FIGS. 3 and 4 are diagrams of the inductive measuring principle applied. In the case of FIG. 3 the mass capable of oscillation is a permanent magnet 44 suspended by a spring 46. The permanent magnet 44 dips into a coil 48. If the permanent magnet 44 oscillates, voltages are induced in the coil and may be picked up at the connections 50. FIG. 4, alternatively, shows a current-carrying coil 52 as the mass capable of oscillation. Coil 52 is again spring-mounted 46 in some way. It can perform in particular longitudinal oscillations, but also torsional oscillations. Coil 52 is within the detecting range of an induction loop 54, in which a voltage and/or current signal is induced if the coil 52 swings mechanically. The signal is coupled out of the induction loop in a suitable way and is then processed in evaluating module 42.

Returning to FIG. 2, a particularly simple inductive oscillation sensor is obtained by converting an ammeter into a pulse generator. An ammeter usually contains indicator mechanics representing a structure capable of oscillation. There is also a measuring coil through which the current to be measured passes. This leads to movement of the indicator mechanics and deflection of the indicator. With only minor conversion work, the principle of this measurement may be reversed. The indicator mechanics is taken as mass which is capable of oscillation as a result of a test jolt applied to housing 10 of the shock absorber test unit. These oscillations induce a signal in the measuring coil of the ammeter, which may serve to detect the oscillations of the indicator mechanics and especially to count these.

The signals of the inductive oscillation sensor 40 are discriminated in evaluating module 42. To this effect the module can especially contain a detector which responds when a triggering level is exceeded as well as a pulse-shaping stage. The discriminated pulses are applied to the input terminal of a counter which counts them. On the output end, said evaluating module 42 is connected via line 56 to the display 26 which indicates the count, and there is another line connection 58 to push button 24.

The testing of shock absorbers of cars by the unit according to the invention is as follows. The unit is positioned above the center of the wheel on a car body part which is as flat as possible and where the unit adheres due to the magnetic holders 14. By actuation of push button 24 the unit is switched on and, at the same time, the counter is set to zero. The car body is given a single heavy jolt on the fender or bumper, i.e., thus pushed downwards, whereafter the body oscillations are left to die down. The test unit is also subjected to these oscillations and, due to its inertia, the mass in the inductive oscillation sensor is also moved. The signal pulses induced thereby are counted by the counter and indicated in display 26. Depending on the quality of the shock absorber, the oscillations die down more or less quickly. A count of 1 indicates an immovable shock absorber that must be replaced or whose suspension has to be examined. If the count is 2, the shock absorber is considered hard, which is acceptable for sports cars; otherwise replacement of the shock absorber would appear recommendable. If the count is 3 or 4, no measures are required, and if the count is 5 or more, the shock absorber is too soft and has to be replaced.

The test measurements are to be repeated above all four wheels; and the count for the left and the right hand side should always be the same. In the case of special car types, standard values should be gained from new cars and serve for comparative purposes.

The shock absorber test unit according to the invention permits the analysis of the general condition of all shock absorbers of a car in a most simple way within a short period. Measuring time does not generally exceed 1 to 2 minutes.

A capacitor 59 is arranged in or at the evaluating module 42 and has a capacitance of 1.0 mF according to a preferred embodiment.

Said capacitor has preferably such a frequency range that minimum oscillations are no longer amplified, so that any ancillary oscillations are no longer recorded in the digital display.

What is claimed is:

1. A shock absorber test unit, comprising: a housing attachable to the body of an automobile and containing a mass which swings with damped oscillations due to inertia and whose number of oscillations is counted and indicated after an exciting jolt of the automobile,
   wherein said mass is part of an inductive oscillation sensor fixed in the interior of said housing, and
   wherein said mass is a current carrying coil suspended by a spring within an induction loop to measure only vertical movements of the automobile.

2. A shock absorber test unit, comprising: a housing attachable to the body of an automobile and containing a mass which swings with damped oscillations due to inertia and whose number of oscillations is counted and indicated after an exciting jolt of the automobile,
   wherein said mass is part of an inductive oscillation sensor fixed in the interior of said housing, and
   wherein said inductive oscillation sensor is an ammeter converted into a pulse generator to measure only vertical movements of the automobile.

3. The shock absorber test unit according to claim 1 or 2, wherein at least one magnetic holder is arranged on the outside of said housing and rigidly fastened thereto.

4. The shock absorber test unit according to claim 3, wherein said housing is rectangular in shape and wherein, to attain a two-point contact on one longitudinal side of said housing, two magnetic holders are provided at a maximum distance apart.

5. The shock absorber test unit according to claim 4, wherein said magnetic holders are each square and spaced well apart and wherein their respective edge lengths correspond approximately to the width of said housing.

6. The shock absorber test unit according to claims 1 or 2, wherein said housing contains a counter connected to said inductive oscillation sensor.

7. The shock absorber test unit according to claim 6, wherein a display connected to said counter is on the outside of said housing.

8. The shock absorber test unit according to claims 1 or 2, wherein said housing contains batteries as an energy source.

9. The shock absorber test unit according to claims 1 or 2, wherein a capacitor is
   electrically connected to an evaluating module, said capacitor having such a frequency range such that minimum oscillations are not detected and, thus, any ancillary oscillations are not recorded in a digital display connected thereto on the housing.

10. The shock absorber test unit according to claim 9, wherein said capacitor has a capacitance of 1.0 microfarad.

* * * * *